May 23, 1944.　　　K. L. STORRS　　　2,349,387
MANUFACTURE OF SMOKELESS FUEL
Filed Jan. 7, 1943　　　6 Sheets-Sheet 1
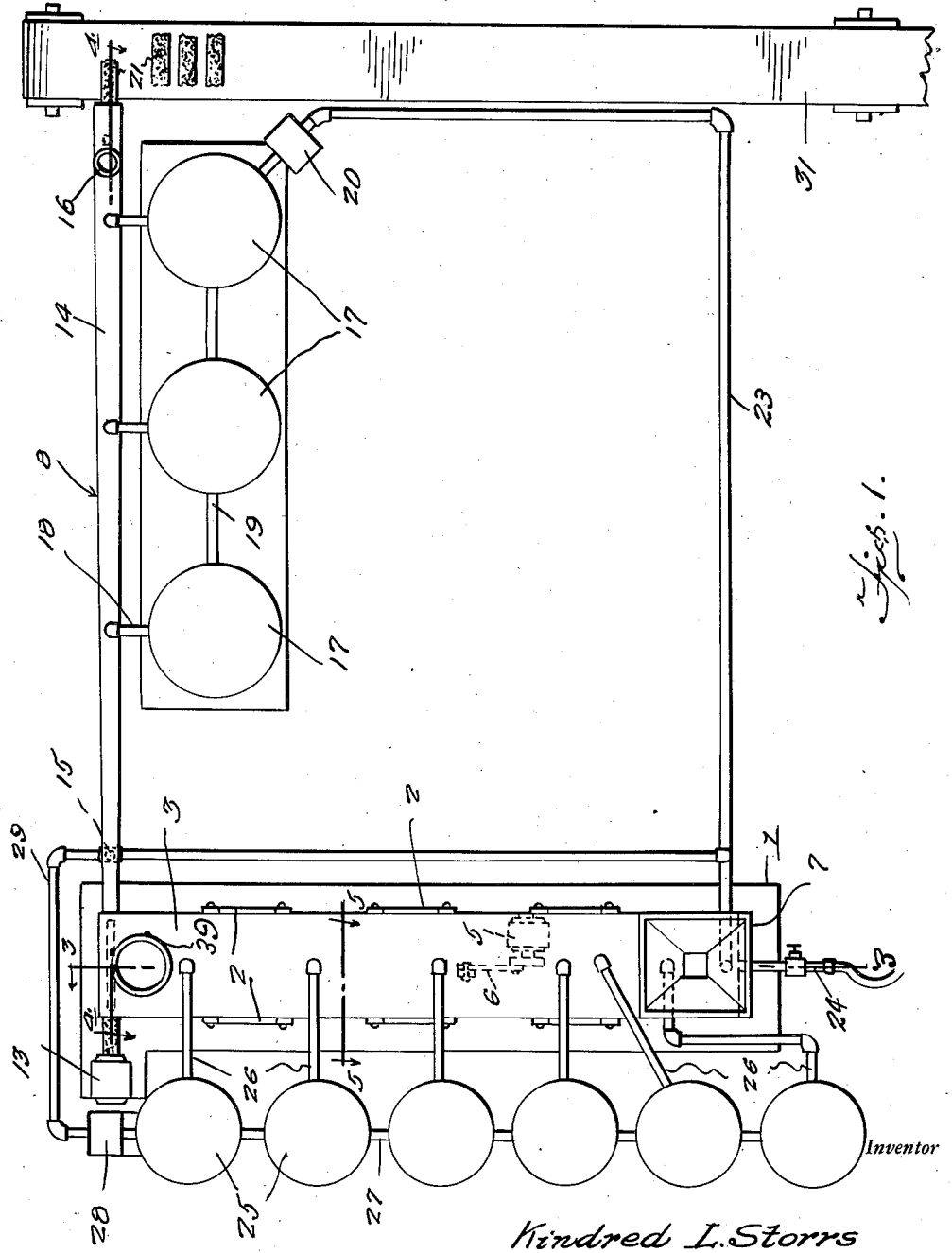
Inventor
Kindred L. Storrs
By Clarence A. O'Brien
and Harvey B. Jacobson
Attorneys

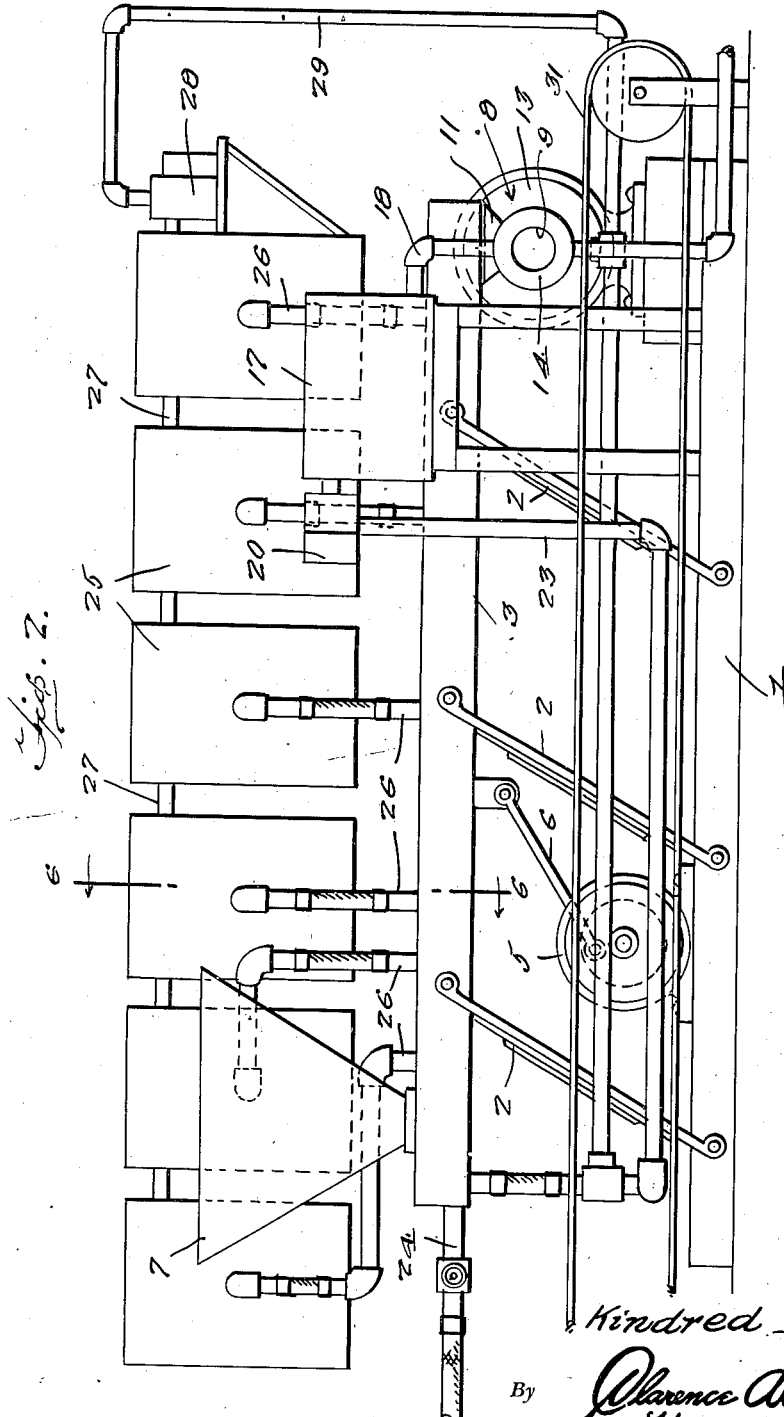

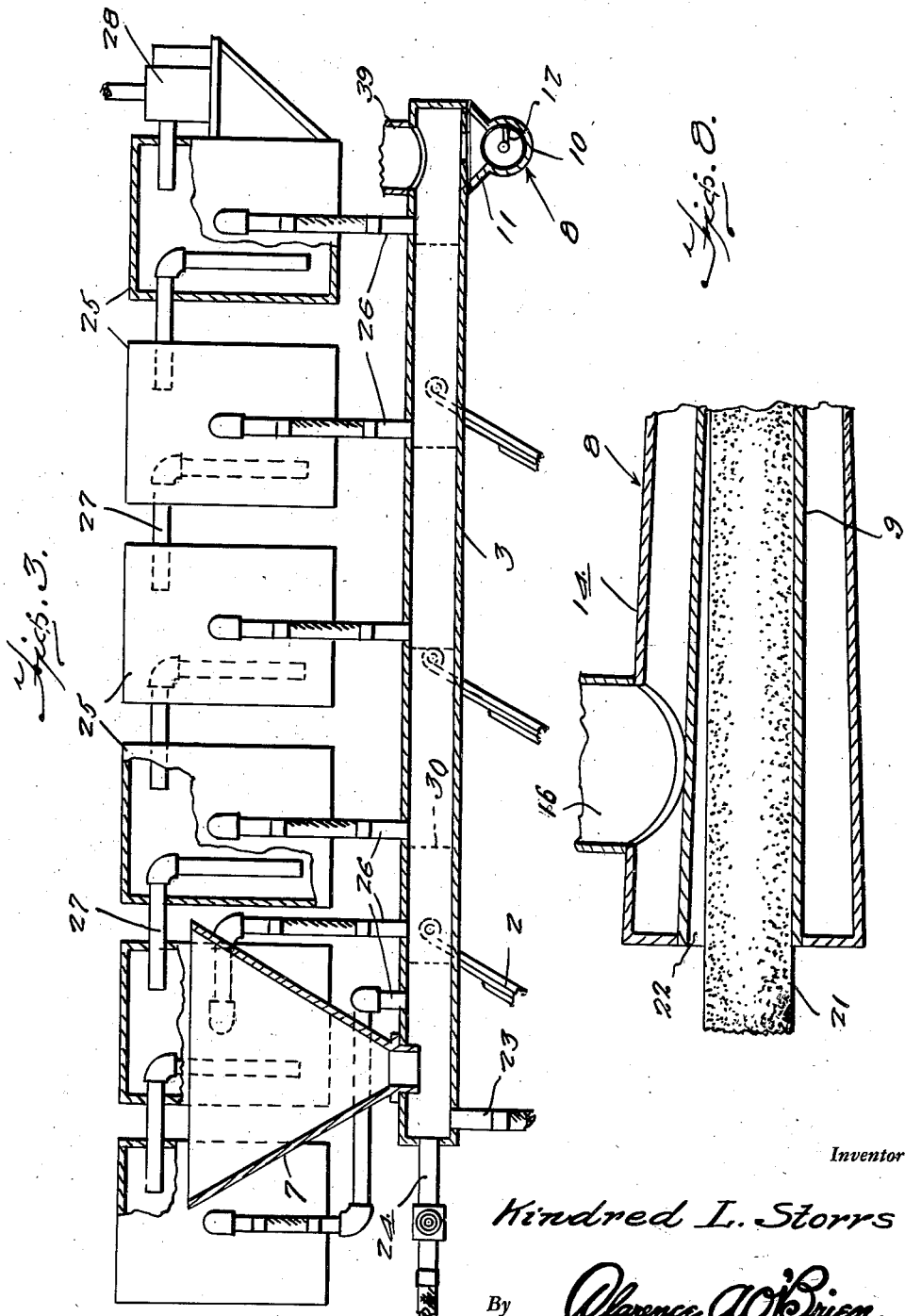

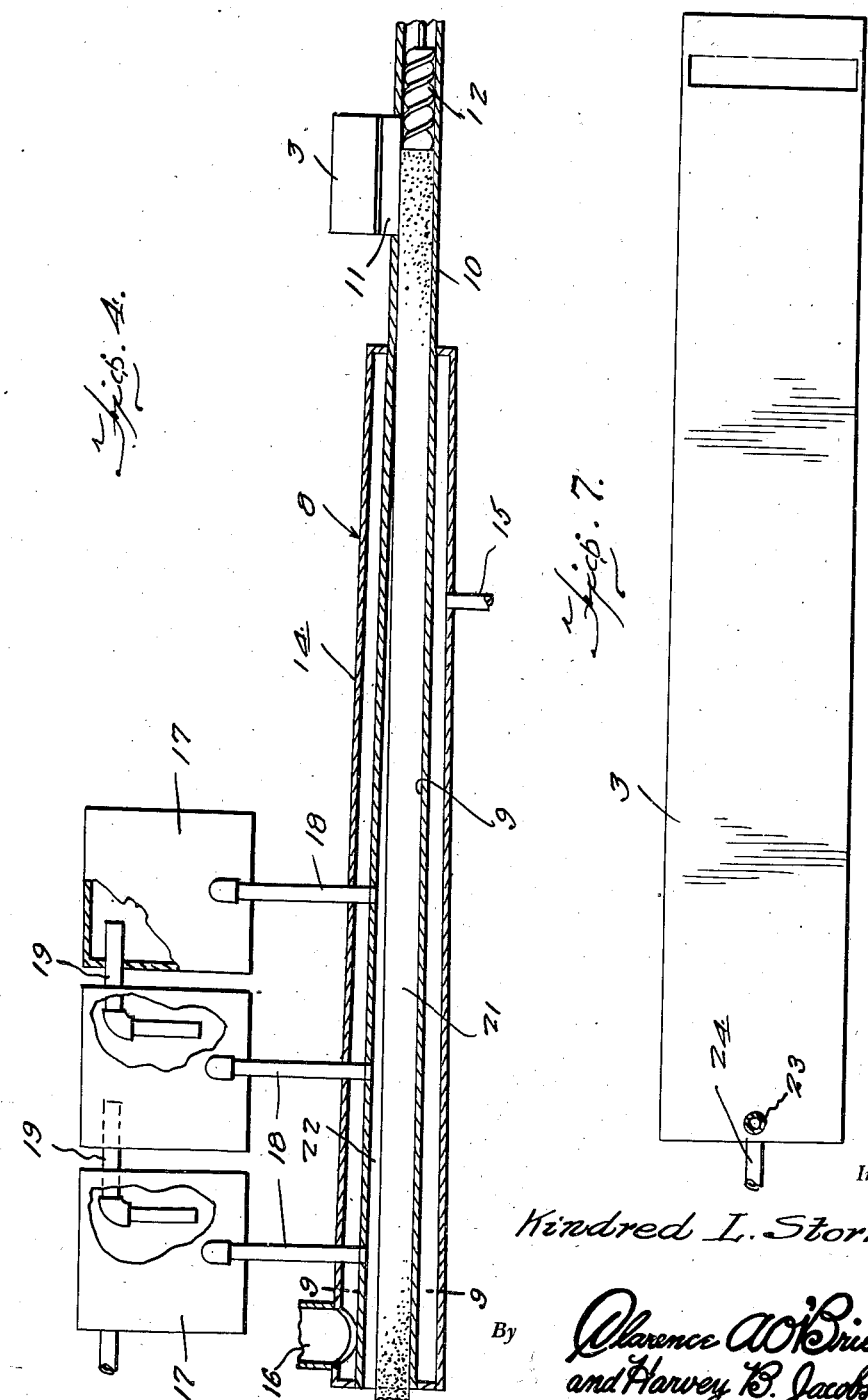

May 23, 1944. K. L. STORRS 2,349,387
MANUFACTURE OF SMOKELESS FUEL
Filed Jan. 7, 1943 6 Sheets-Sheet 5
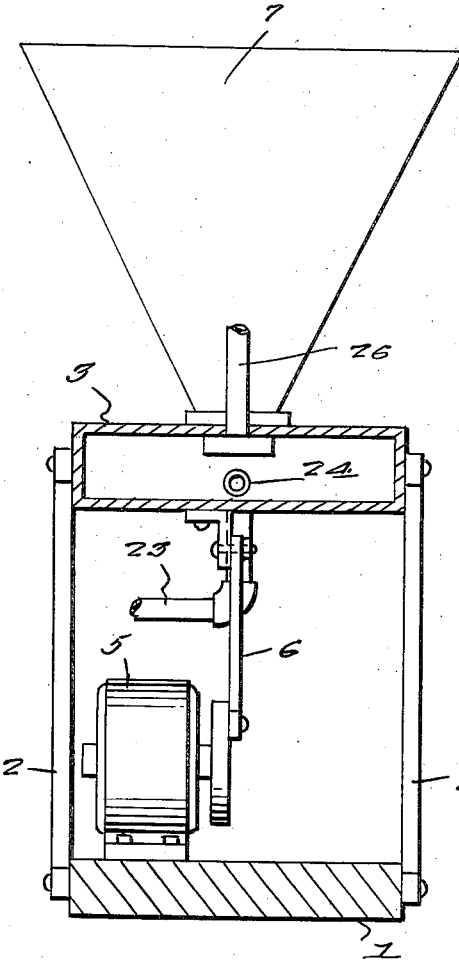
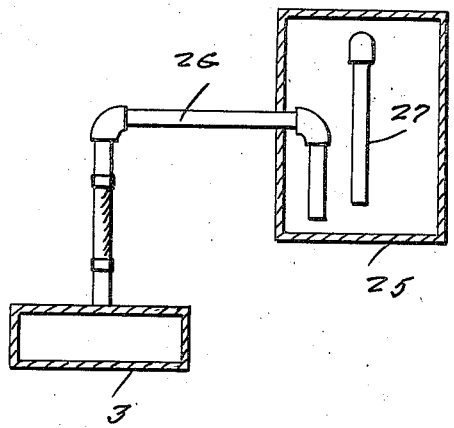
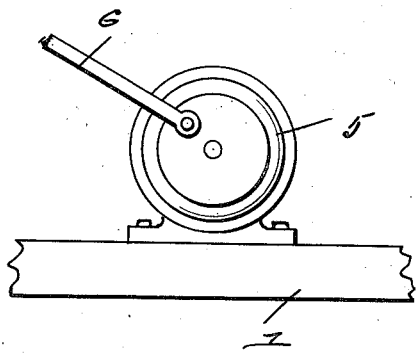
Inventor
Kindred L. Storrs
By Clarence A. O'Brien
and Harvey B. Jacobson
Attorneys May 23, 1944.  K. L. STORRS  2,349,387
MANUFACTURE OF SMOKELESS FUEL
Filed Jan. 7, 1943  6 Sheets-Sheet 6

Inventor
Kindred L. Storrs
By Clarence A. O'Brien
and Harvey B. Jacobson
Attorneys Patented May 23, 1944

2,349,387

UNITED STATES PATENT OFFICE 2,349,387

MANUFACTURE OF SMOKELESS FUEL

Kindred L. Storrs, Salt Lake City, Utah, assignor to The Coal Logs Co. Inc., Salt Lake City, Utah, a corporation of Utah Application January 7, 1943, Serial No. 471,625

3 Claims. (Cl. 202—119)

The present invention relates generally to the manufacture of high temperature coke and smokeless fuel from coal and other carbonaceous matter and has for one of its important objects to provide a novel apparatus and method whereby the material will be treated and the fuel produced by a continuous process.

Another very important object of the invention is to provide an apparatus of the character described which embodies novel means for recovering the by-products from the material progressively as it is continuously treated and for utilizing portions of said by-products as fuel for heating said material.

Other objects of the invention are to provide a fuel manufacturing apparatus of the aforementioned character which will be comparatively simple in construction, strong, durable, highly efficient and reliable in operation, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an apparatus constructed in accordance with the present invention for the production of high temperature coke.

Figure 2 is a view in front elevation thereof.

Figure 3 is a view in vertical longitudinal section through the vibrating retort, taken substantially on the line 3—3 of Figure 1, showing the by-product recovery tanks associated with said retort, portions of said tanks being broken away in section.

Figure 4 is a view in vertical section through the extrusion tube, taken substantially on the line 4—4 of Figure 1.

Figure 5 is a cross sectional view, taken substantially on the line 5—5 of Figure 1.

Figure 6 is a cross sectional view, taken substantially on the line 6—6 of Figure 2.

Figure 7 is a bottom plan view of the vibrating retort.

Figure 8 is an enlarged view in longitudinal section through the discharge end portion of the extrusion tube.

Figure 9 is a cross sectional view through the extrusion tube, taken substantially on the line 9—9 of Figure 4.

Figure 10 is a detail view in side elevation of the retort actuating motor.

Figure 13:
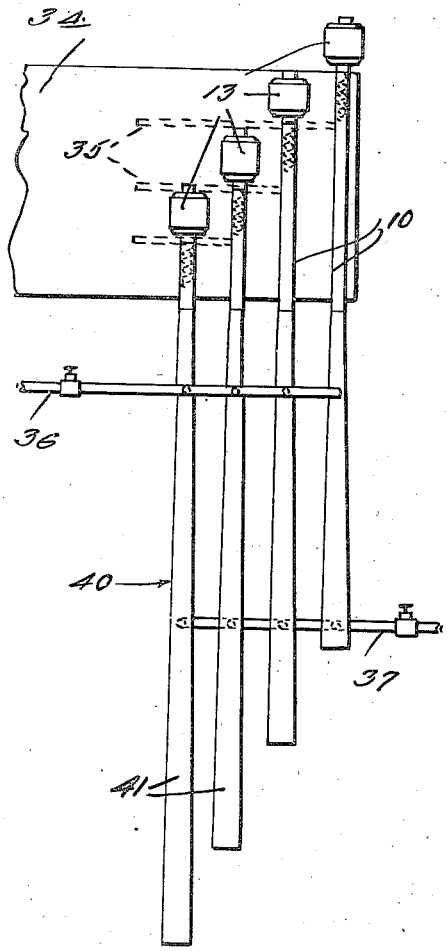
Figure 13 is a bottom plan view of an embodiment for the production of low temperature smokeless fuel.

Referring now to the drawings in detail, it will be seen that reference numeral 1 designates a suitable base. Springs 2 support a retort 3 in elevated position for vibration on the base 1. The vibrating retort 3 is of rectangular or other suitable cross-section and is provided in its forward end portion, with an exhaust 39. An electric motor 4 on the base 1 is operatively connected to the retor 3 by means including a pitman 6. The coal or other material is discharged into the retort 3 adjacent one end thereof from a hopper 7.

Mounted at the other end of the retort 3 is an extrusion unit which is designated generally by reference numeral 8. As illustrated to advantage in Figure 4 of the drawings, the unit 8 comprises a tapered tube 9 including an end portion 10 of uniform diameter which extends transversely beneath the adjacent end portion of the retort 3 for receiving material therefrom. Toward this end, a hopper or the like 11 is provided which communicates with the discharge opening in the retort 3. It will be observed that the extrusion tube 9 tapers from its discharge end to the portion 10 of said tube. A fuel compressing and ejecting worm 12 is operable in the end portion 10 of the extrusion tube 9, said worm being actuated by an electric motor 13.

The unit 8 further includes a heating jacket or furnace 14 which encloses the tapered portion of the extrusion tube 9 in spaced relation thereto. A fuel supply pipe 15 is connected at any suitable point to the heating jacket 14. The jacket 14 is further provided with an exhaust 16.

Tanks 17 are connected by pipes 18 to the tapered portion of the extrusion tube 9 at longitudinally spaced points for removing by-products therefrom. The tanks 17 communicate with each other through conduits 19. A suitable suction pump 20 is connected to one of the tanks 17. The coke log 21, as it is expressed from the portion 10 of the tube 9 by the worm 12 and passes through the tapered portion of said tube to the discharge end thereof, is of uniform diameter. Thus, a space 22, with which the pipes 18 communicate, is left in the tapered portion of the tube 9, which space progressively diminishes inwardly from the discharge end of said tube.

A fuel conduit 23 connects the suction pump 20 to the intake end portion of the vibrating retort 3 for heating the material in said retort to the desired temperature, said conduit 23 including a flexible section adjacent said retort. Also connected to this end portion of the retort 3 is a starting and auxiliary fuel conduit 24 from any suitable source of supply.

Stationary tanks 25 are connected by flexible conduits 26 to the retort 3 at longitudinally spaced points for recovering the by-products from the material in said retort. The tanks 25 communicate with each other through pipes 27. A suction pump 28 is connected to one of the tanks 25. A fuel conduit 29 connects the discharge side of the suction pump 28 to the conduit 23 at a point adjacent the intake end of the retort 3. The fuel pipe 15 is connected to the conduit 29.

It is thought that the operation of the apparatus for the manufacture of high temperature coke will be readily apparent from a consideration of the foregoing. Briefly, the coal or other material flows by gravity into the retort 3 from the hopper 7 and is caused to feed or move toward the discharge end of said retort by the vibration thereof. This movement of the material through the retort 3 may be regulated as desired by controlling the speed of the electric motor 5. As the material passes through the retort 3 it is brought to the desired temperature and the by-products are removed therefrom by the suction pump 28. As the material moves through the vibrating retort 3, the temperature of said material progressively increases and the by-products are drawn off in the different heat zones, such as are suggested by the dotted lines 30 in Figure 3 of the drawings into the tanks 25. The condensable products are condensed in the tanks 25. The material moves continuously from the cold to the hot end of the retort 3 and is thus progressively heated to a plastic or semi-plastic state at the hot end only. Sticking of the coal to the retort, therefore, can only occur when the plastic or semi-plastic state is reached, or when the distilled volatile matter is removed at a slower rate than it is being generated. The latter possibility is eliminated by the correct design and operation of the entire condensing system. A sticky stage in the material is not reached until said material is ready to drop into the unit 8.

The material drops by gravity from the vibrating retort 3 into the unit 8, said material entering the uniform portion 10 of the extrusion tube 9 in which it is compressed and molded into a log 21 by the worm 12. This log 21 moves outwardly in the tapered portion of the extrusion tube 9, being heated as it does so by the jacket 14, and the different volatiles or by-products are progressively taken off at the succeeding heat zones by the spaced pipes 18 and enter the tanks 17 where the condensable by-products are condensed. All or portions of the non-condensable by-products may be returned in the form of fuel gas from the condensers 17 and 25 to the retort 3 through the conduits 23 and 29 for heating the material in said retort to the desired temperature. An endless conveyor 31 is provided for receiving the fuel from the unit 8. The log 21, as it leaves the extrusion tube 9, may be cut or broken off in desired lengths and deposited on the conveyor 31 in any suitable manner.

Figure 12:
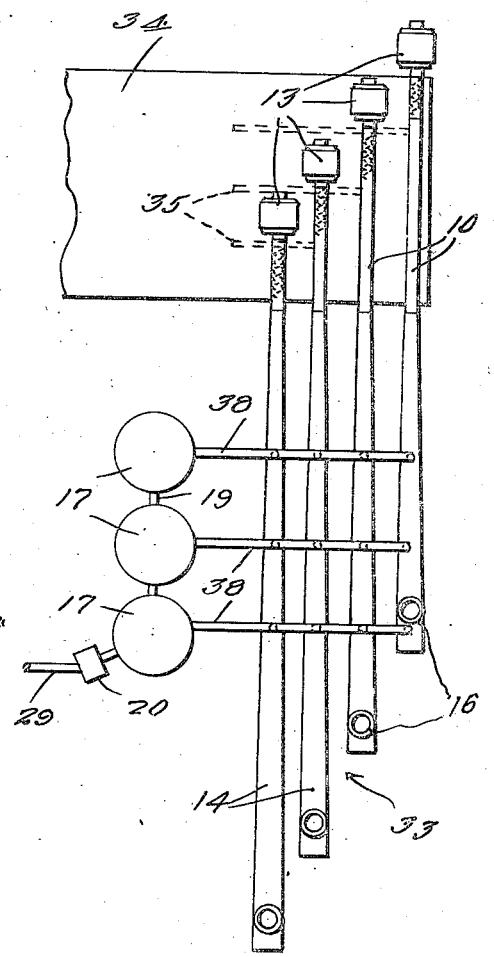
Figure 12 is a bottom plan view of a modification.
Figure 11:
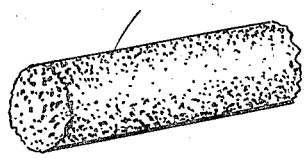
Figure 11 is a perspective view of a length of the extruded fuel.

In the embodiment of Figure 12 of the drawings, a series of extrusion units 33 are provided for receiving the material from a retort 34. Longitudinal division plates or partitions 35 are provided in the discharge end portion of the retort 34, between which division plates the discharge openings to the units 33 are located. By-product take-off manifolds 38 connect the units 33 at spaced points to the condensing tanks 17 for withdrawing the volatiles.

The embodiment shown in Figure 13 of the drawings is for the production of low temperature smokeless fuel. This apparatus includes a series of units 40 substantially similar to the units 33 of Figure 12, but wherein the jackets 41 are for the reception of cooling water. Toward this end, water supply and exhaust manifolds 36 and 37, respectively, are connected to the cooling jackets 41. In this arrangement the tanks 17, etc. are dispensed with.

It is believed that the many advantages of an apparatus constructed in accordance with the present invention will be readily understood and although preferred embodiments are as illustrated and described, it is to be understood that further modifications and changes in the details of construction may be resorted to which will fall within the scope of the invention as claimed.

Having described the invention, what is claimed as new is:

1. A fuel and high temperature coke manufacturing apparatus comprising, a vibrating retort for receiving and heating the material from which the fuel is to be produced, an extrusion unit communicating with the retort for receiving the material therefrom, said extrusion unit including means for molding and compressing the material, means for further heating progressively the molded and compressed material, and means for removing by-products from the material at spaced points in the second-named means, condensing portions of said by-products and returning all or a portion of the non-condensable by-products as fuel to said retort.

2. An apparatus of the character described for the production of fuel comprising, a vibrating retort for receiving and heating the material from which the fuel is being produced, an extrusion unit for receiving the material from the retort, said extrusion unit including a heating jacket of circular cross section and means for expressing the material through said jacket, and means for withdrawing volatiles from the extruding unit at spaced points, condensing portions of said volatiles and returning all or a portion of the uncondensed volatile as fuel to the retort.

3. An apparatus of the character described for producing fuel comprising, in combination, a vibrating retort for receiving and heating the material from which the fuel is being produced, means for withdrawing by-products from the material at spaced points in the retort, condensing portions of said by-products and returning all or portions of the uncondensed portions of the by-products as fuel to the retort, and an extrusion unit communicating with the retort for receiving the material therefrom, said unit comprising a tube, means for expressing the material through said tube, and cooling means associated with the tube.

KINDRED L. STORRS.